United States Patent
Lin et al.

(10) Patent No.: US 7,529,096 B2
(45) Date of Patent: May 5, 2009

(54) COMMON FRAMEWORK FOR STACKABLE MODULATOR PERSONAL COMPUTER

(75) Inventors: Te-An Lin, Taipei Hsien (TW);
Chih-Hsiung Chen, Taipei Hsien (TW);
Wu-Nan Wang, Taipei Hsien (TW);
Cheng Tu, Taipei Hsien (TW);
Ching-Tang Lin, Taipei Hsien (TW)

(73) Assignee: AOPEN Inc., Hsichih, Taipei Hsien ( * ) Notice: Subject to any disclaimer, the term of this patent is extended or adjusted under 35 U.S.C. 154(b) by 215 days.

(21) Appl. No.: 11/730,030

(22) Filed: Mar. 29, 2007

(65) Prior Publication Data

US 2008/0061661 A1    Mar. 13, 2008

(30) Foreign Application Priority Data

Aug. 9, 2006    (TW) .............................. 95129272 A

(51) Int. Cl.
*H05K 5/00* (2006.01)
(52) U.S. Cl. ..................... 361/724; 361/679; 312/223.2
(58) Field of Classification Search ......... 361/724–727; 312/223.2
See application file for complete search history.

(56) References Cited

U.S. PATENT DOCUMENTS

| | | | | | |
|---|---|---|---|---|---|
| 5,515,239 | A | * | 5/1996 | Kamerman et al. | 361/724 |
| 5,604,662 | A | * | 2/1997 | Anderson et al. | 361/727 |
| 5,737,189 | A | * | 4/1998 | Kammersgard et al. | 361/726 |
| 5,913,926 | A | * | 6/1999 | Anderson et al. | 361/685 |
| 6,640,235 | B1 | * | 10/2003 | Anderson | 361/685 |
| 6,661,648 | B2 | * | 12/2003 | Dayley | 361/683 |
| 7,099,151 | B2 | * | 8/2006 | Jones et al. | 361/686 |
| 7,242,589 | B1 | * | 7/2007 | Cheng et al. | 361/735 |
| 2007/0253159 | A1 | * | 11/2007 | Lin et al. | 361/724 |
| 2007/0281531 | A1 | * | 12/2007 | Cheng et al. | 439/304 |
| 2008/0002346 | A1 | * | 1/2008 | Lin et al. | 361/683 |

* cited by examiner

*Primary Examiner*—Lisa Lea-Edmonds

(57) ABSTRACT

A common framework for a stackable modular personal computer comprises an outer frame and an inner frame and is capable of accepting an expansion card connecter and an expansion card projected out to an inner space thereof from a lower layer thereof. The inner frame can further be combined with a supporting frame use for combining with a CD-ROM drive or a hard disk driver. Whereby, one same common framework can have three different uses so as to attain to the function of one framework with multiple uses to save the cost for manufacturing different frameworks.

12 Claims, 8 Drawing Sheets

COMMON FRAMEWORK FOR STACKABLE MODULATOR PERSONAL COMPUTER

BACKGROUND OF THE INVENTION

1. Field of the Invention

The present invention relates to a personal computer, and more particularly to a framework of a multi-configuration stackable modular personal computer structure.

2. Description of Related Art

U.S. Pat. No. 6,118,663 discloses a multi-configuration modular computer; it comprises a display module, a keyboard and pointer device module, a motherboard and power module, a mass-storage module, and an expansion module. A user can stack and assemble different uses of devices such as LCD displayer, notebook computer and desktop computer by selecting and combining different modules.

Taiwan Patent Publish No. 490,121 discloses a housing structure capable of integrating a modular computer comprising a plurality of cabin bodies. Elements such as semi-system cabin and a displayer cabin are installed in the cabin bodies. The semi-system cabin is constituted by a housing, an inner seat and a panel; the semi-system cabin and the displayer cabin are combined with each other stably through a plurality connection elements so as to allow the whole to have an identical length and width, and have corresponding spaces for providing various connecting wires and terminals to be disposed in a connection space at a rear side of each cabin.

According to the combination computer disclosed in the United States patent mentioned above, the communication between each two adjacent modules is done by means of male and female terminals and not by means of electric wires always used in a general assembled computer, the terminal in a upper layer module cannot be electrically connected to the terminal in a lower layer module by striding electric wires across intermediate modules.

According to the combination computer disclosed in the Taiwan patent mentioned above, a connection structure between each two layers and various electrical connection wires are all exposed in s hollow part at the rear end of the housing such that the outlook of the entire modeling is influenced.

Please refer to FIGS. 1 and 2. Taiwan Patent Application No. 095,110,580 applied by the applicant of the present invention discloses a stackable modular personal computer structure; it comprises a first framework 10, second framework 20, third framework 30 and fourth framework 40, fifth framework 50 and upper cover 60 stacked to combine with each other in a sequence. A downside of the first framework 10 is combined with a plurality of foot rests 70. A bottom of each other framework above the first framework 10 has a hole for allowing at least one electric wire to be passed through to enable the electric wires of the modular personal computer and a combination structure of each layer are all hid inside the frameworks so that an identical outlook can be obtained.

Taiwan Patent Application No. 095,110,581 further applied by the applicant of the present invention discloses a framework structure of a computer mainframe, in which a second framework 20 comprises a housing and a supporting frame in which the supporting frame is combined with an inner portion of the housing. A rear end of a first plate is pivotally connected to a bottom of the supporting frame, and a front end of the first plate is combined with a downside of the bottom of the supporting frame and positioned on a downside of a first hole of the supporting frame. A hard disk driver can be locked on an upside of the first plate. Bottoms of a plurality of shafts are respectively combined with a plurality of holes on the bottom of the supporting frame so as to use upper ends of the shafts to combine with a motherboard to allow the hard disk player to be positioned below the motherboard to benefit a space disposition above the motherboard and be convenient on the maintenance or the replacement of the hard disk driver.

SUMMARY OF THE INVENTION

For further allowing various different computer components to be respectively assembled in one same layer of framework of a modular personal computer to attain to the function of one framework with multiple uses, the present invention is proposed.

The main object of the present invention is to provide a common framework for a stackable modular personal computer, allowing various different computer components to be respectively assembled in a same framework to attain to the function of one framework with multiple uses.

Another object of the present invention is to provide a common framework for a stackable modular personal computer, allowing a same framework to be used as a plurality of frameworks so as to save the cost for respectively manufacturing different frameworks.

A common framework for a stackable modular personal computer is used for allowing various different computer components to be respectively accepted in a same framework, comprising:

An outer frame, a bottom thereof has a first side extended inward, a first front side of the outer frame has a hollow face and the hollow face has a first through hole;

An inner frame, a bottom thereof has a second side extended outward, a second front side of the inner frame has a conveniently detachable net plate, the inner frame is combined with a inner side of the outer frame, the first side of the bottom of the outer frame is propped against the second side of the bottom of the inner frame;

Whereby, various different computer components are respectively accepted in a space inside the inner frame to allow the inner frame to accept an expansion card connecter and expansion card at a lower layer and projected out to the inner space thereof; the inner frame can further be combined with a supporting frame and respectively combined with a click drive or hard click driver to enable the common framework to have three different uses to attain to the function of one framework with multiple uses so that the cost for respectively manufacturing different frameworks can be saved.

BRIEF DESCRIPTION OF THE DRAWINGS

The present invention can be more fully understood by reference to the following description and accompanying drawings, in which.

DETAILED DESCRIPTION OF THE INVENTION

A common framework for a stackable modular personal computer of the present invention is used for allowing various different computer components can respectively accepted in a same framework.

Figure 1:
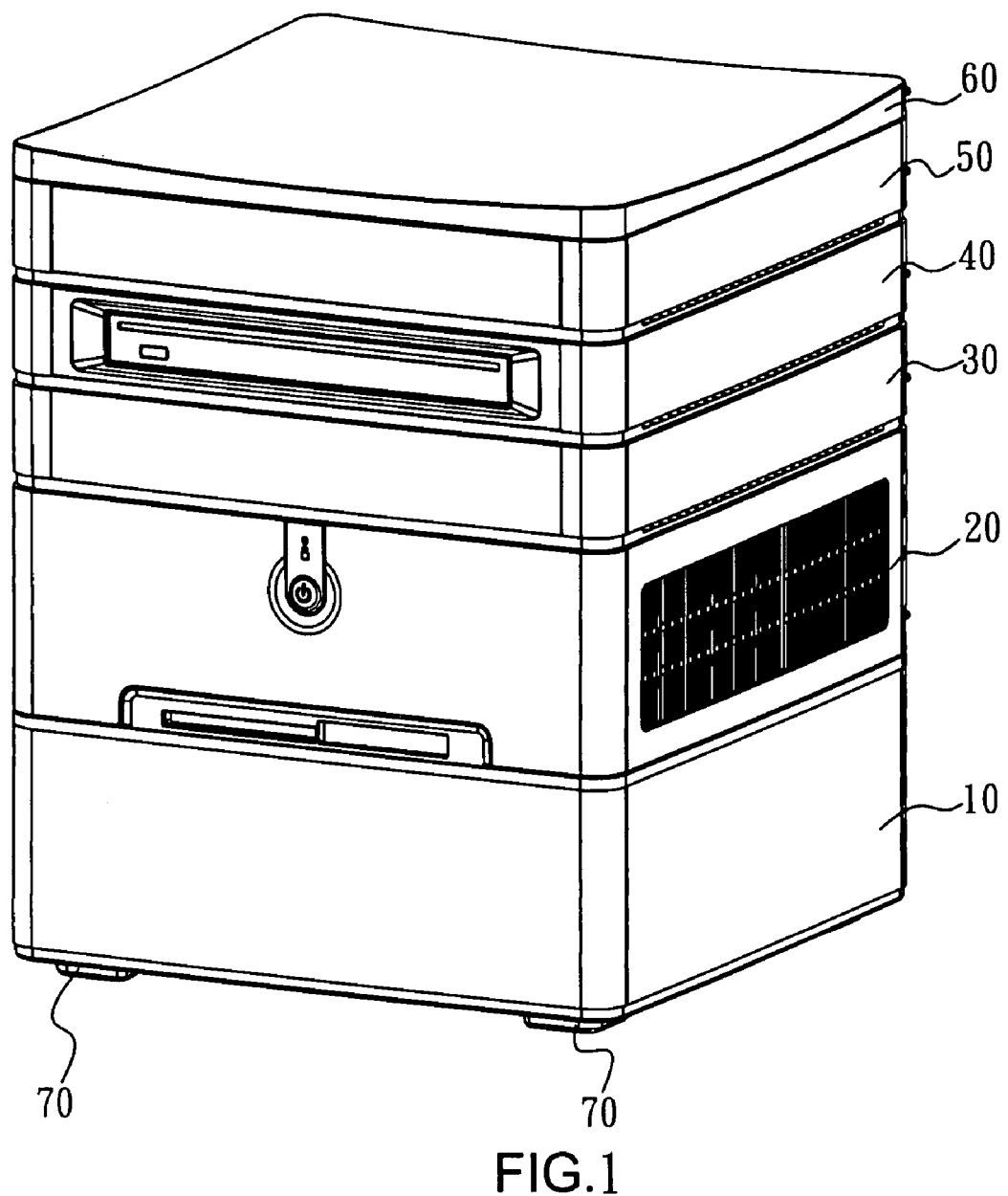
FIG. 1 is a schematic view, showing a framework of a preferred embodiment according to the present invention assembled in a stackable modular personal computer.
Figure 2:
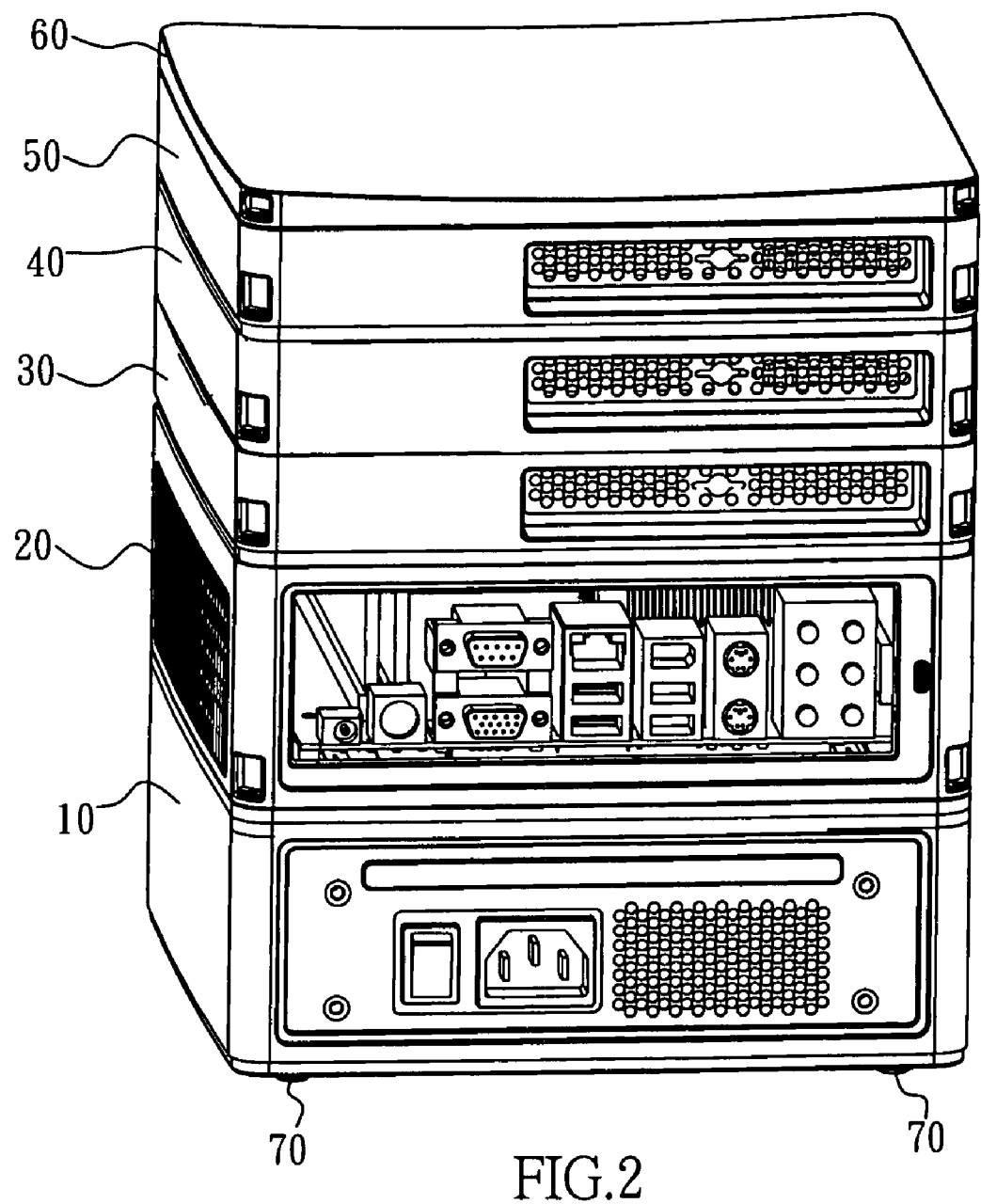
FIG. 2 is another schematic view, showing a framework of a preferred embodiment according to the present invention assembled in a stackable modular personal computer.
Figure 3:
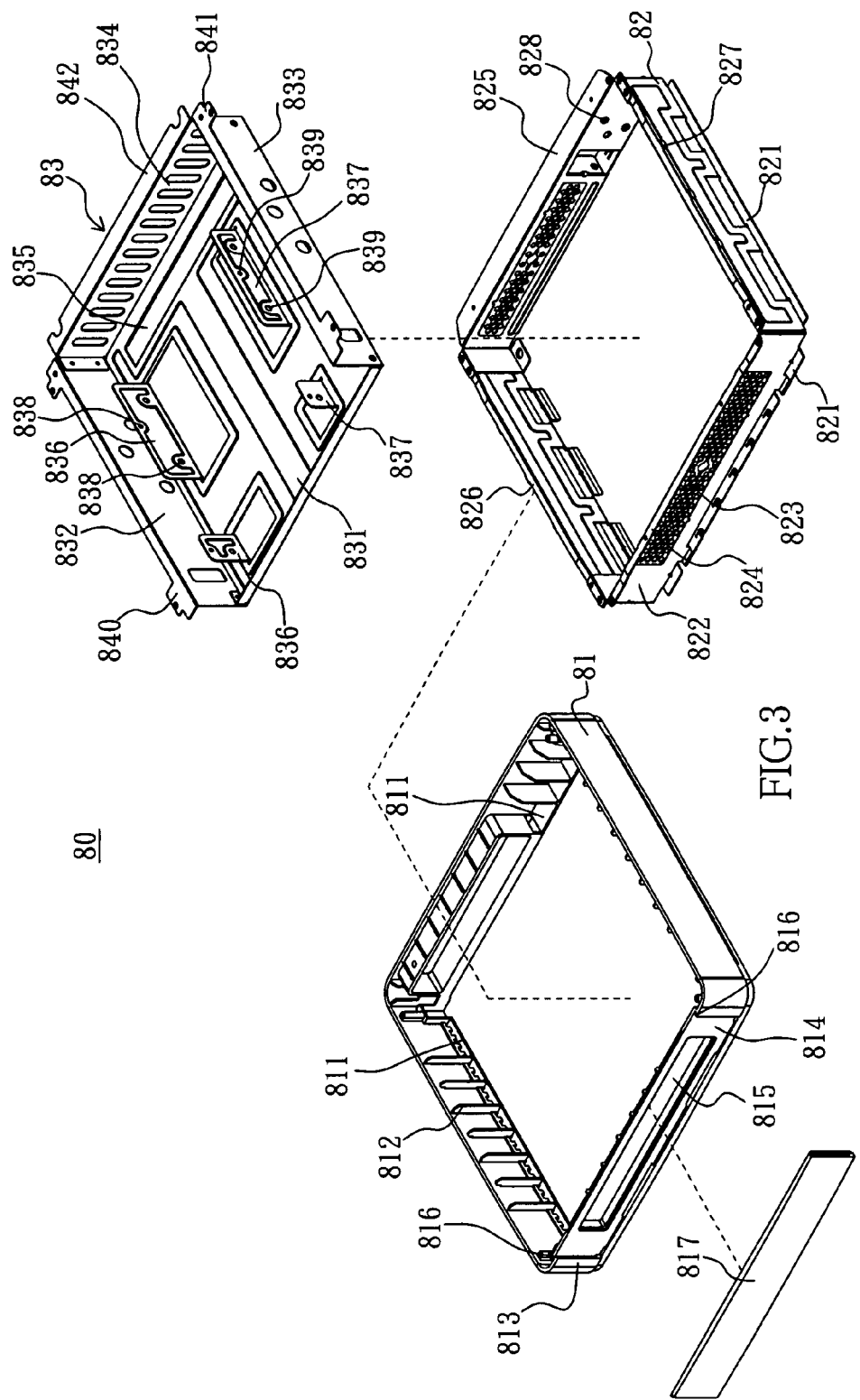
FIG. 3 is an exploded view, showing a framework of a preferred embodiment according to the present invention.

Please refer to FIG. 3, A common framework 80 of the present invention can respectively used as a third framework 30, fourth framework 40 and fifth framework 50 shown in FIGS. 1 and 2. The common framework 80 of a preferred embodiment according to the present invention comprises an outer frame 81, a shielding plate 817, an inner frame 82 and a supporting frame 83.

A bottom of outer frame 81 has a first side 811 extended inward and an inner side thereof has a plurality of fins 812. A first front side 813 of the outer frame 81 has a hollow face 814 that has a first through hole 815 and left and right sides of the hollow face 814 are respectively provided with a guiding groove 816.

Figure 4:
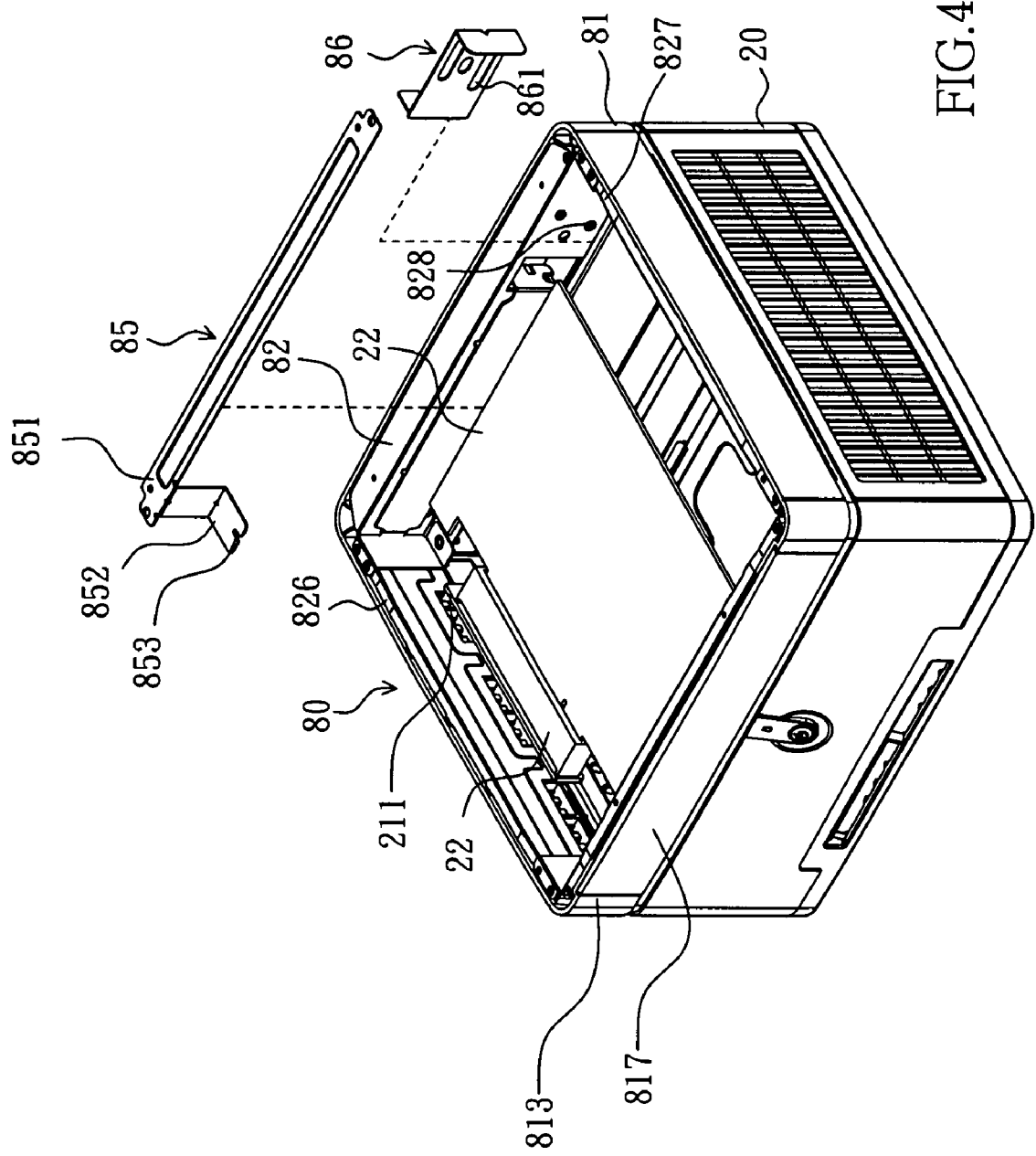
FIG. 4 is a schematic view, showing a frame work of a preferred embodiment according to the present invention not combined with parts of elements in a first use manner.

Left and right sides of the shielding plate 817 can respectively placed in the guiding groove 816 to allow the shielding plate 817 to be combined with the hollow face 814 to shield the first through hole 815 as FIG. 4 shows.

A bottom of the inner frame has a second side 821 extended outward and a second front side 822 of the inner frame 82 has a conveniently detachable net plate 823. A second through hole is formed at a position on the second front side 822 occupied by the net plate 823 at the first place after the net plate 823 of the second front side 822 is detached; the second through hole and the first through hole 815 are communicated. First front, first rear, first left and first right sheets 824, 825, 826 and 827 extended outward are respectively disposed at upper ends of four sides of the inner frame 82. When the inner frame 82 is combined with an inside of the outer frame 81, the first side 811 of the bottom of the outer frame 81 is propped against the second side 821 of the bottom of the inner frame 82, the fins 812 of the outer frame 81 are respectively propped against an outer side of the inner frame 82, and the first front, the first rear, the first left and the first right sheets 824, 825, 826 and 827 of the inner frame 82 are respectively placed on upper ends of the fins 812 of the outer frame 81.

The supporting frame 83 is constituted by a bottom plate 831, a left side plate 832, a right side plate 833 and a rear side plate 834. The bottom plate 831 has a third through hole 835 used for allowing electric wires to be passed through. At least one left side tab 836 and at least one right side tab 837 are respectively disposed on an upper end of the bottom plate 831, and the left and the right side tabs 836 and 837 are respectively provided with a plurality of holes 838 and 839 used for engaging with screws. Upper ends of the left, the right and the rear side plates 832, 833 and 834 are respectively provided with second left, second right and second rear sheets 840, 841 and 842 extended outward. When the supporting frame 83 is combined with an inside of the inner frame 82, the second let, the second right and the second rear sheets 840, 841 and 842 of the supporting frame 83 are respectively place on upper ends of the first left, the first right and the first rear sheets 826, 827 and 825 of the inner frame 82 and the corresponding first and second sheets are respectively provided with corresponding holes and screw holes so as to allow screws to combine the supporting frame 83 with the inner frame 82.

Figure 5:
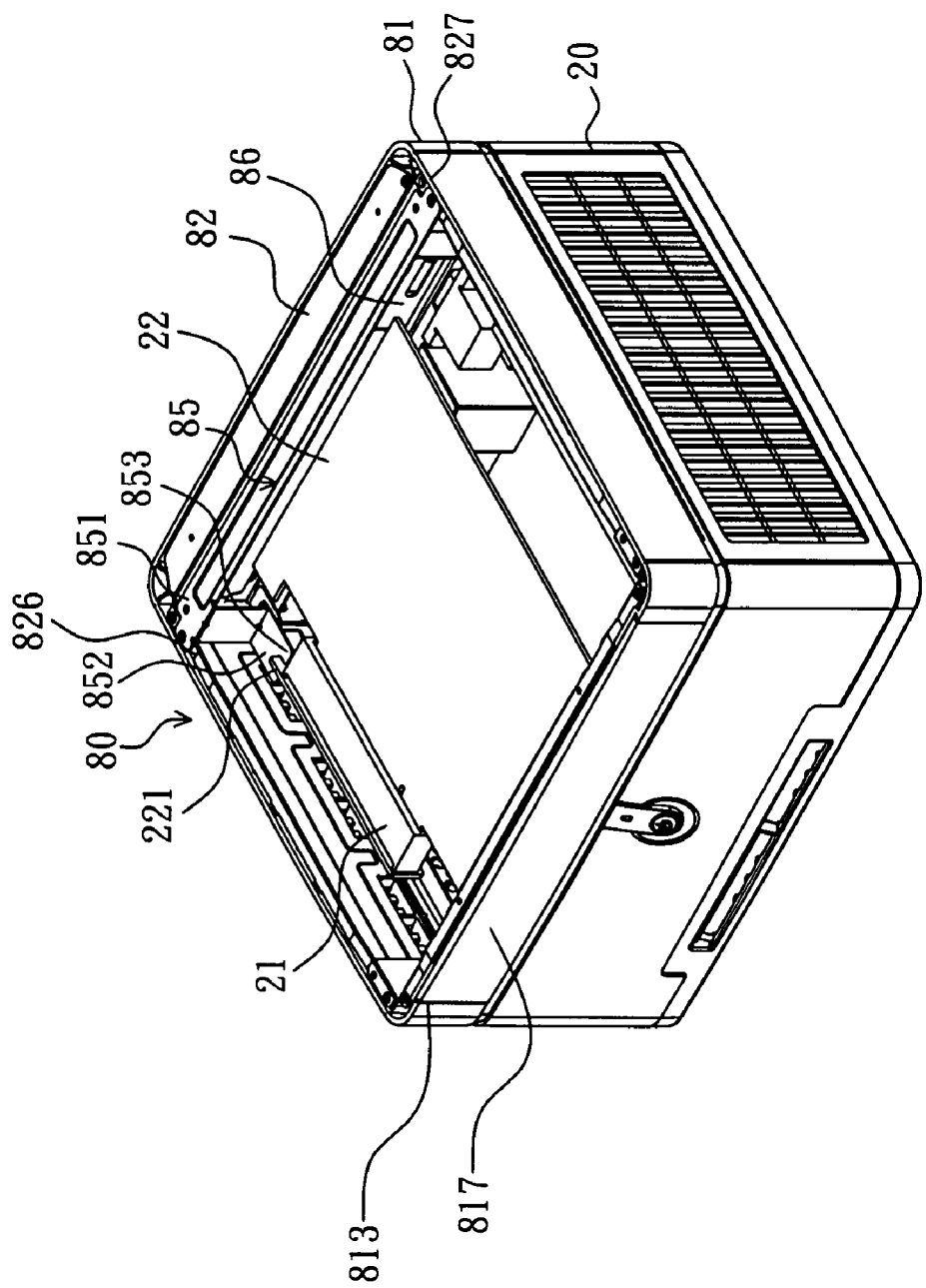
FIG. 5 is schematic view, showing a first use manner for a framework of a preferred embodiment according to the present invention.
Figure 6:
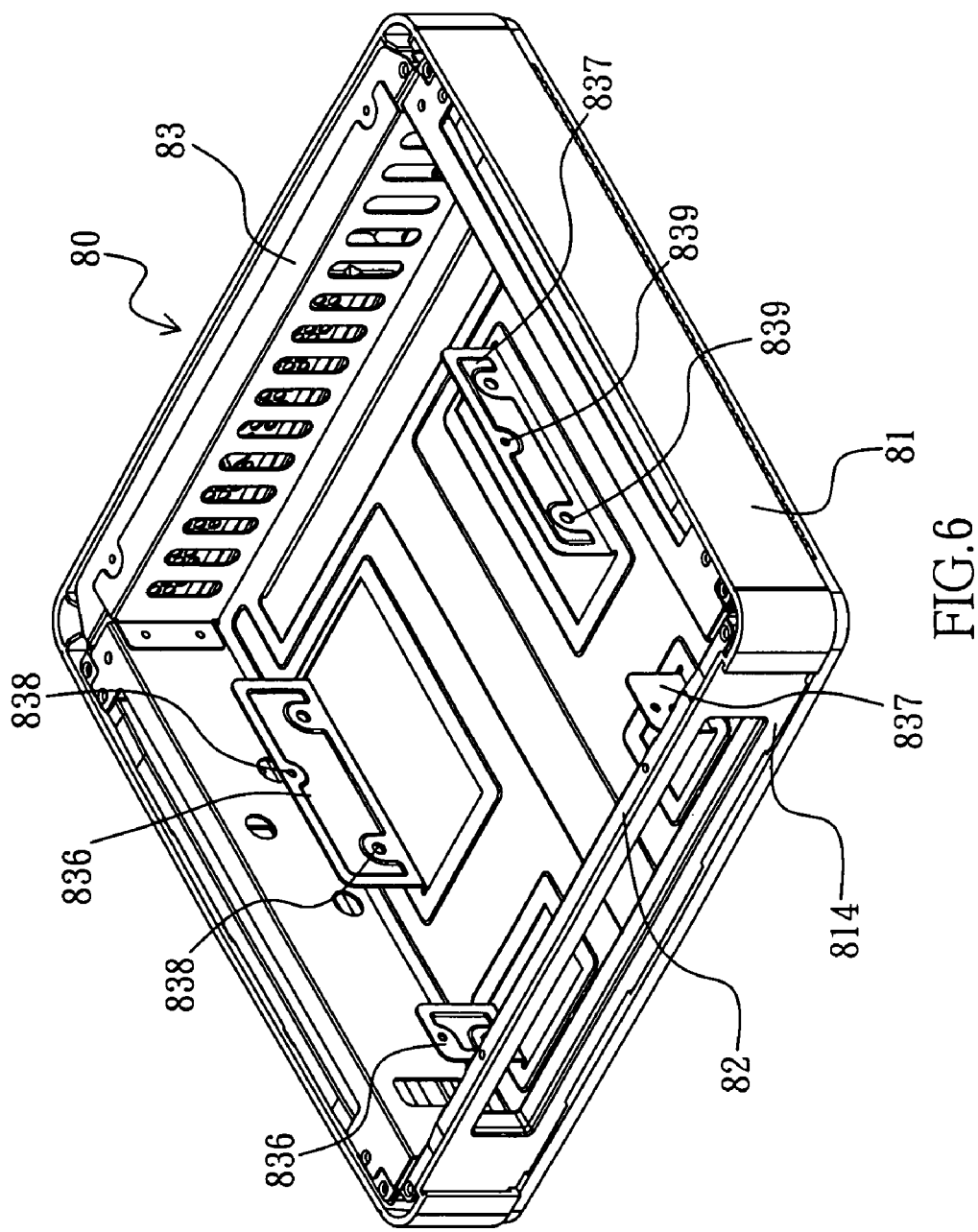
FIG. 6 is a schematic view, showing a frame work of a preferred embodiment according to the present invention not combined with parts of elements in a second use manner.

Please refer to FIGS. 3, 4 and 5. The common framework 80 of the present invention can be combined with an upper end of another framework such as a second framework 20 shown in FIGS. 1 and 2. When the inner frame 82 of the common framework 80 is not combined the supporting frame 83, the net plate 823 is not detached and the shielding plate 817 is allowed to combine with the hollow face 814; an inner portion of the inner frame 82 is open at this time such that inner portions of the common framework 80 and the second framework 20 are communicated to be able to accept a first kind computer component projected out to the upper end of the second framework 20, such as expansion card connecter 21, which is combined with a expansion card 22. The inner frame 82 can further be combined with a first fixing frame 85 and a second fixing frame 86. An upper end of the first frame 85 is provided with a plate 851 and a buckling element 852; A lower end of a left side of the plate 851 is connected with the buckling element 852 projected frontward and a front end of the buckling element is provided with a slot 853, left and right sides of the plate 851 are respectively place on upper ends of the first left and the first right sheet 826 and 827 of the inner frame 82; the left and the right sides of the plate 851 and the first left and the first right sheets 826 and 827 respectively have corresponding holes and screw holes such that they can be combined together through screws. The slot 853 at the front end of the buckling element 852 is engaged with a rear end of a side plate 211 of the expansion card connecter 21 to cause the expansion card connecter 21 to be fixed. The second fixing element 86 is provided with at least one long slot 861 corresponding to a screw hole 828 on a rear side of the inner frame 82 so as to allow the second fixing element 86 to be combined with the inner frame 82 at the rear side thereof through screws. An upper end of the second fixing frame 86 supports a lower end of the first fixing frame 85 as FIG. 5 shows.

Figure 7:
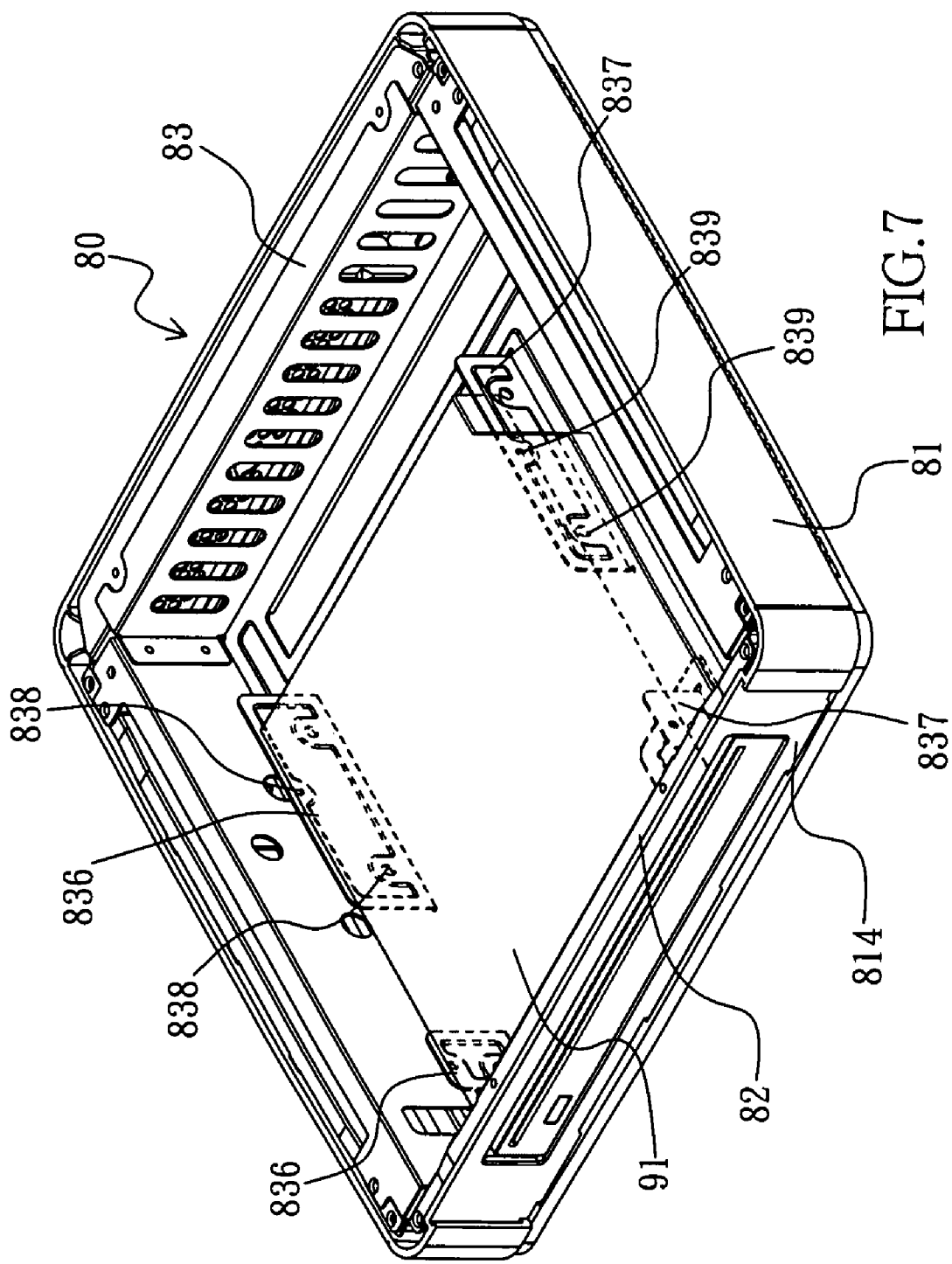
FIG. 7 is schematic view, showing a second use manner for a framework of a preferred embodiment according to the present invention.
Figure 8:
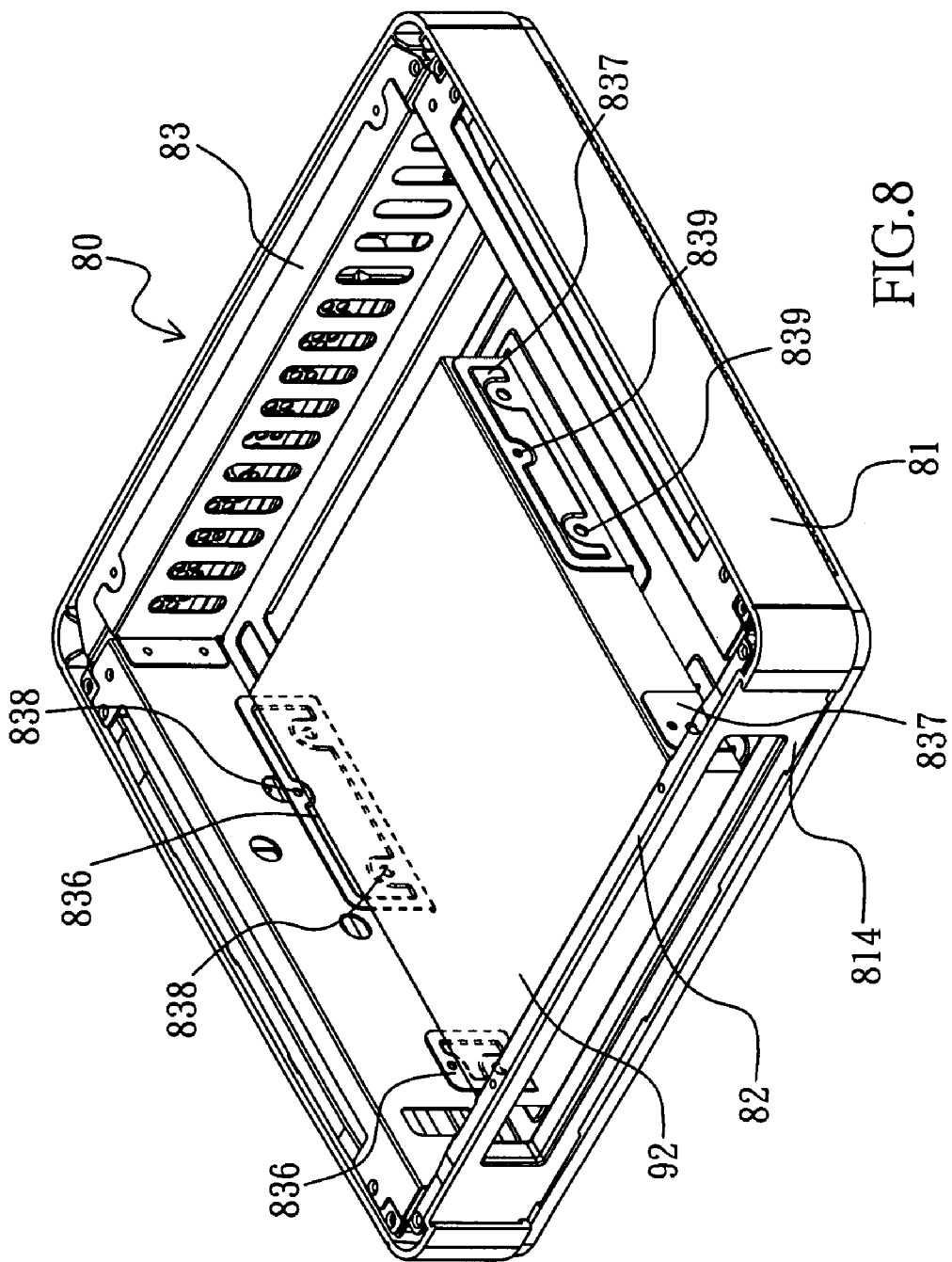
FIG. 8 is a schematic view, showing a third use manner for a framework of a preferred embodiment according to the present invention.

Please refer to FIGS. 3, 6, 7 and 8. A distance between the left and the right side tabs 836 and 837 of the supporting frame 83 is corresponding to a distance of a lower end of a second or a third kind computer component such as a disk driver or a hard disk drive. The disk driver can be a DVD-ROM drive or a CD-ROM drive. A space between at least one left and at least one right side tabs 836 and 837 of the supporting frame 83 of the common framework 80 of the present invention can be combined with the second kind computer component such as a DVD-ROM drive or a CD-ROM drive 91 as FIG. 7 shows or combined with the third kind computer component such as a hard disk driver 92 as FIG. 8 shows after the outer frame 81 is allowed to combine with the inner frame 82 and the inner frame 82 is then allowed to combine with the supporting frame 83. The CD-ROM drive 91 or the hard disk driver 92 is allowed to combine with the supporting frame 83 by passing a plurality of screws respectively through the holes 838 and 839 of the left and the right side tabs 836 and 837 to engage them in corresponding screw holes on the CD-ROM drive 91 or the hard disk driver 92. The net plate 823 of the inner frame 82 can be detached and the hollow face 814 of the outer frame 81 is allowed not to combine with the shielding plate 817 so as to be convenient to operate the CD-ROM drive 91 through the first through hole when the supporting frame 83 is combined with the CD-ROM drive 91.

The inner frame 82 of the common framework 80 of the present invention can be used for accepting the expansion card connecter 21 and the expansion card 22 projected to an inner space thereof from a layer below it and is capable of combining with the first fixing element 85 and the second fixing element 86 so as to further allow the expansion card connecter 21 to be fixed. The inner frame 82 of the common framework 80 of the present invention also further combined with the supporting frame 83 and the supporting frame 83 is used to combine with the CD-ROM drive 91 or the hard disk driver 92 to enable one same common framework 80 to have three kinds of different uses so as to attain to the function of one frame with multiple uses to save the cost for respectively manufacturing different frameworks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A common framework for a stackable modular personal computer, allowing one same framework to accept various computer components, comprising: an outer frame, a bottom thereof having a first side extended inward, a first front side of said outer frame having a hollow face, said hollow face being provided with a first through hole; an inner frame, a bottom thereof having a second side extended outward, a second front side of said inner frame having a conveniently detachable net plate, said inner frame being combined with an inner side of said outer frame, said first side of said bottom of said outer frame being propped against said second side of said bottom of said inner frame; whereby, a space of an inner portion of said inner frame is utilized to accept various computer components.

2. The framework according to claim 1, wherein a plurality of fins are disposed at an inner side of said outer frame, upper ends of four sides of said inner frame are respectively provided with first front, first rear, first left and first right sheets extended outward, said fins of said outer frame are respectively propped against an outer side of said inner frame, said first front, said first rear, said first left and said first right sheets of said inner frame are respectively places on upper ends of said fins of said outer frame.

3. The common framework according to claim 1, wherein a guiding groove are respectively disposed on left and right sides of said hollow face; left and right sides of a shielding plate are respectively placed in said guiding grooves, said shielding plate is combined with said hollow face to shield said first through hole; an inner portion of said inner frame is open; whereby, when said common framework is combined with another framework at a upper end thereof, said common framework is communicated with an inner portion of said another framework and used for accepting a first kind computer component projected out of said upper end of said another framework.

4. The common framework according to claim 3, wherein a plurality of fins are disposed at an inner side of said outer frame, upper ends of four sides of said inner frame are respectively provided with first front, first rear, first left and first right sheets extended outward, said fins of said outer frame are respectively propped against an outer side of said inner frame, said first front, said first rear, said first left and said first right sheets of said inner frame are respectively places on upper ends of said fins of said outer frame.

5. The common framework according claim 4, wherein said first kind computer component is an expansion card connecter, said expansion card connecter is combined with an expansion card, said expansion card is placed inside said inner frame.

6. The common frame framework according to claim 1, wherein said inner frame is combined with a supporting frame, said supporting frame has a bottom plate, said bottom is provided with a third through hole used for allowing electric wires to be passed through, at least one left side tab and at least one right side tab are disposed on an upper end of said bottom plate, said left and said right side tabs are respectively provided with a plurality of holes used for engaging with screws, a distance between said left and said right tabs is corresponding to at least one of second and third kind computer components; whereby, a plurality of screws are respectively combined in corresponding screw holes of one of said second and said third computer components by respectively passing said screws through said holes of said left and said right side tabs.

7. The common framework according to claim 6, wherein a plurality of fins are disposed at an inner side of said outer frame, said fins of said outer frame are respectively propped against an outer side of said inner frame.

8. The framework according to claim 6, wherein a plurality of fins are disposed at an inner side of said outer frame, are disposed inside said outer frame, upper ends of four sides of said inner frame are respectively provided with a first front, first rear, first left and first right sheets extended outward, said fins of said outer frame are respectively propped against outer sides of said inner frame, said first front, said first rear; said first left and said first right sheets are respectively places on upper ends of said fins of said outer frame.

9. The common framework according to claim 8, wherein said supporting frame comprises a bottom plate, left side plate, right side plate and rear side plate, upper ends of said left, said right and said rear side plates are respectively provided with a second left, second right and second rear sheets extended outward, said second, said second right and said second rear sheets are respectively placed on upper ends of said first left, said first right and said first rear sheets of said inner frame.

10. The common framework according to claim 9, wherein said first left, said first right and said first rear sheets and corresponding said second left, said second right and said second rear sheets are respectively provided with holes and screw holes; whereby, said supporting frame and said inner frame are combined through screws.

11. The common framework according to claim 10, wherein said second and said third kind computer components respectively are a disk drive and hard disk driver.

12. The common frame according to claim 11, wherein said disk drive is combined between said left and said right side tabs of said supporting frame, said net plate at said second front side is detached to form a second through hole and said second through hole is communicated with said first through hole.

* * * * *